United States Patent
Lee et al.

(10) Patent No.: US 9,436,222 B2
(45) Date of Patent: Sep. 6, 2016

(54) STAND MODULE AND MOBILE TERMINAL INCLUDING THE STAND MODULE

(71) Applicant: LG ELECTRONICS INC., Seoul (KR)

(72) Inventors: Jungyun Lee, Seoul (KR); Jonghoon Kim, Seoul (KR); Yongho Lee, Seoul (KR); Hangseok Kim, Seoul (KR); Sukho Hong, Seoul (KR)

(73) Assignee: LG ELECTRONICS INC., Seoul (KR)

(*) Notice: Subject to any disclaimer, the term of this patent is extended or adjusted under 35 U.S.C. 154(b) by 87 days.

(21) Appl. No.: 14/595,778

(22) Filed: Jan. 13, 2015

(65) Prior Publication Data

US 2015/0201511 A1    Jul. 16, 2015

(30) Foreign Application Priority Data

Jan. 14, 2014 (KR) .................. 10-2014-0004759

(51) Int. Cl.
| | |
|---|---|
| *H01Q 1/24* | (2006.01) |
| *G06F 1/16* | (2006.01) |
| *F16M 13/00* | (2006.01) |
| *H04B 1/38* | (2015.01) |
| *H04M 1/04* | (2006.01) |
| *H04B 1/3877* | (2015.01) |

(52) U.S. Cl.
CPC ............ *G06F 1/1633* (2013.01); *F16M 13/00* (2013.01); *G06F 1/166* (2013.01); *G06F 1/1626* (2013.01); *G06F 1/1698* (2013.01); *H04B 1/38* (2013.01); *H04B 1/3877* (2013.01); *H04M 1/04* (2013.01)

(58) Field of Classification Search
CPC ..... G06F 1/1626; G06F 1/166; F16M 13/00; H01Q 1/244
USPC .......... 343/702, 900, 901, 903; 248/96, 150, 248/166, 176.1, 176.3
See application file for complete search history.

(56) References Cited

U.S. PATENT DOCUMENTS

| | | | | |
|---|---|---|---|---|
| 3,579,241 | A * | 5/1971 | Antista .................. | H01Q 1/084 343/702 |
| 5,682,182 | A * | 10/1997 | Tsubosaka ........ | G02F 1/133308 345/173 |
| 7,358,926 | B2 * | 4/2008 | Komoto ................. | H01Q 1/084 343/702 |
| 7,487,940 | B2 * | 2/2009 | Saez ..................... | A47B 23/043 248/176.1 |
| 7,545,332 | B2 * | 6/2009 | Kim ....................... | H01Q 1/084 343/702 |
| 2003/0160138 | A1 * | 8/2003 | Rawlings ............... | F16M 11/02 248/176.3 |
| 2009/0095854 | A1 * | 4/2009 | Forbes ................... | F16M 11/40 248/176.3 |

* cited by examiner

*Primary Examiner* — Tho G Phan
(74) *Attorney, Agent, or Firm* — KED & Associates, LLP

(57) ABSTRACT

Provided is a stand module including: a rod formed in a body of a mobile terminal so as to extend from the body of the mobile terminal, and supporting the body of the mobile terminal when the rod extends from the body of the mobile terminal; and a rotation control unit that controls rotation of the rod after the rod extends from the body of the mobile terminal, wherein the rod includes: a first rod formed in the body of the mobile terminal, the first rod having one end combined with the rotation control unit; a second rod exposed to the outside of the body of the mobile terminal when extending from the mobile terminal; and a hinge portion that connects the first rod and the second rod with each other, and that serves as an axis about which the second rod rotates with respect to the first rod.

20 Claims, 19 Drawing Sheets

STAND MODULE AND MOBILE TERMINAL INCLUDING THE STAND MODULE

CROSS-REFERENCE TO RELATED APPLICATION

Pursuant to 35 U.S.C. §119(a), this application claims the benefit of earlier filing date and right of priority to Korean Application No. 10-2014-0004759, filed on Jan. 14, 2014, the contents of which is incorporated by reference herein in its entirety.

BACKGROUND OF THE DISCLOSURE

1. Field of the Disclosure

The present invention relates to a mobile terminal that includes a stand module supporting the mobile terminal.

2. Background of the Disclosure

A terminal is broadly categorized by mobility into a mobile terminal and a stationary terminal. The mobile terminal is further categorized by portability into a handheld terminal and a vehicle-mounted terminal.

In response to an increasing demand for diversified functions, the terminal has been realized in the form of a multimedia player with multiple functions such as shooting a photographic object as a still image or moving images, reproducing digital audio and video compression files, playing a game, receiving a broadcast or the like.

Efforts are ongoing to support and increase the functionality of mobile terminals. Such efforts include software and hardware improvements, as well as changes and improvements in the structural components.

On the other hand, the user has the inconvenience of viewing a moving image on a mobile terminal with grasping the mobile terminal with his/her hand.

SUMMARY OF THE DISCLOSURE

Therefore, an aspect of the detailed description is to provide a mobile terminal that has a stand module.

Another aspect of the detailed description is to provide a stand module that includes rods that rotate with respect to each other.

To achieve these and other advantages and in accordance with the purpose of this specification, as embodied and broadly described herein, there is provided as a rod formed in a body of a mobile terminal so as to extend from the body of the mobile terminal, and supporting the body of the mobile terminal when the rod extends from the body of the mobile terminal; and a rotation control unit that controls rotation of the rod after the rod extends from the body of the mobile terminal, wherein the rod includes: a first rod formed in the body of the mobile terminal, the first rod having one end combined with the rotation control unit; a second rod exposed to the outside of the body of the mobile terminal when extending from the mobile terminal; and a hinge portion that connects the first rod and the second rod with each other, and that serves as an axis about which the second rod rotates with respect to the first rod.

In the stand module, the rotation control unit may include a body that comes into contact with an outer circumferential surface of the rod in a sliding manner, and a wing portion that is provided at one side of the body and that is to be combined with the body of the mobile terminal.

The stand module may further comprise a guide portion that is formed on one side of the body to protrude to the outside from one side of the body and that, when coming into contact with the body of the mobile terminal, limits movement of the body.

In the stand module, a movement limiting portion that has a larger cross-sectional area than the first rod is formed on one end of the first rod, and an insertion portion is provided on the movement limiting portion, wherein the insertion portion is inserted into a groove formed in an outer circumferential surface of the body to control rotation of the rod.

In the stand module, the outer circumferential surface of the rod is formed to have at least one or more flat surfaces along an axial direction, an inner circumferential surface of the body may have a shape corresponding to the outer circumferential surface of the rod.

In the stand module, a movement limiting portion that has at least one flat surface along an axial direction and that has a larger cross-sectional area than the first rod may be formed on a lower end of the first rod, and the body may have a rotation prevention portion that protrudes toward the outside to contact to the flat surface.

In the stand module, the body of the mobile terminal may have a mating member with a flat surface that the movement limiting portion brings into contact with in order to be held in place.

In the stand module, the movement limiting portion that has a larger cross-sectional area than the rod may be provided on a lower end of the rod, a protrusion may be formed on one portion of an outer circumferential surface of the movement limiting portion, and the stand module further may comprise a rotation prevention member that is arranged between the body and the movement limiting portion on an outer circumferential surface of the rod, the rotation prevention member having a groove corresponding to the protrusion.

In the stand module, a movement limiting portion that has a larger cross-sectional area than the rod may be formed on one end of the rod, a first spiral-shaped portion may be formed along an outer circumferential surface of the rod on the movement limiting portion, a second spiral-shaped guide portion that is to be engaged with the first spiral-shaped guide portion may be formed on one end of the body.

In the stand module, multiple grooves may be formed in an outer circumferential surface of the first rod in an axial direction, one or more locking members that, when inserted into the grooves, limit the rotation of the rod, may be provided in the body In the stand module, the locking member has elasticity, the locking member may further include: a support portion that is inserted into the body; and one or more locking portions having a convex shape toward the grooves.

In the stand module, a friction member may be provided in the body.

In the stand module, one end of the body may be coupled with the movement limiting portion formed at one end of the rod in a concavo-convexed manner.

In the stand module, a vibration reduction member, having a larger cross-sectional area than the movement limiting portion, may be provided on one end of the movement limiting portion.

The stand module may further include a third rod that is connected to the second rod with a hinge, one end of the third rod is connected to a rear side of the body of the mobile terminal and the other end of the third rod comes into contact with a supporting object.

In the stand module, the other end of the third rod may have a flat surface.

In the stand module, a vibration sensor that detects vibration when the second rod is flicked may be provided on one side of the stand module.

In the stand module, the detected vibration may be used as an input value when an application embedded in the mobile terminal runs.

The stand module may be used as a DMB antenna.

To achieve these and other advantages and in accordance with the purpose of this specification, as embodied and broadly described herein, there is provided a mobile terminal including the stand module.

Effects of the mobile terminal and the stand module according to the present invention are as follows. According to at least one of the embodiments of the present invention, in a case where the user views a moving image on the mobile terminal, there is an advantage of supporting the mobile terminal without having to adding a component to support the mobile terminal.

In addition, according to at least one of the embodiments of the present invention, there is an advantage of adjusting an angle of elevation of the mobile terminal according to a user's preference.

Effects according to the present invention are not limited to the effects described above. Effects not described above are apparent from the below description to a person of ordinary skill in the art.

Further scope of applicability of the present application will become more apparent from the detailed description given hereinafter. However, it should be understood that the detailed description and specific examples, while indicating preferred embodiments of the disclosure, are given by way of illustration only, since various changes and modifications within the spirit and scope of the disclosure will become apparent to those skilled in the art from the detailed description.

BRIEF DESCRIPTION OF THE DRAWINGS

The accompanying drawings, which are included to provide a further understanding of the disclosure and are incorporated in and constitute a part of this specification, illustrate exemplary embodiments and together with the description serve to explain the principles of the disclosure.

In the drawings.

DETAILED DESCRIPTION OF THE DISCLOSURE

Figure 1A:
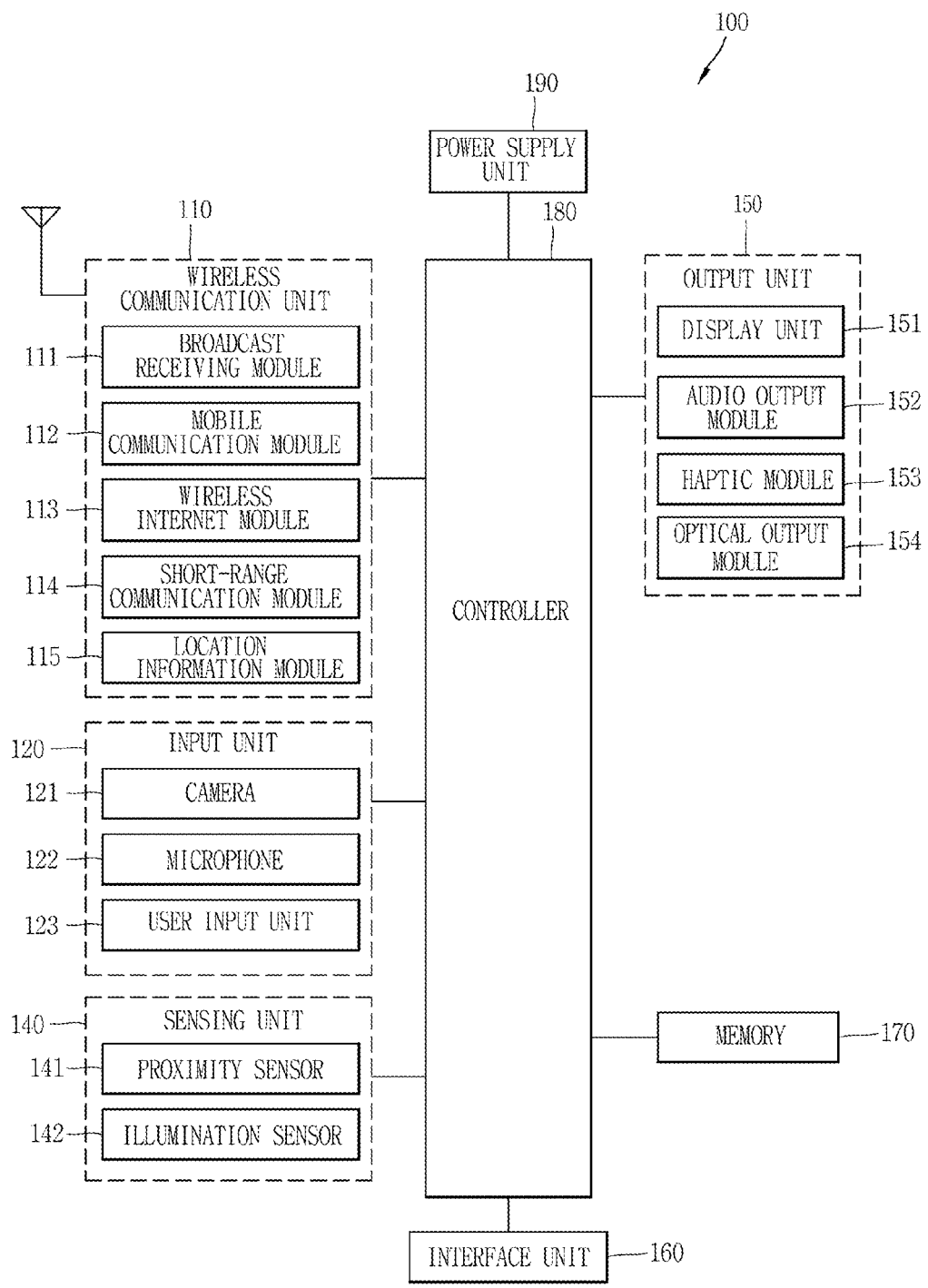
FIG. 1A is a block diagram for describing a mobile terminal according to the present invention.

Description will now be given in detail according to exemplary embodiments disclosed herein, with reference to the accompanying drawings. For the sake of brief description with reference to the drawings, the same or equivalent components may be provided with the same or similar reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the other element or intervening elements may also be present. In contrast, when an element is referred to as being "directly connected with" another element, there are no intervening elements present.

A singular representation may include a plural representation unless it represents a definitely different meaning from the context.

Terms such as "include" or "has" are used herein and should be understood that they are intended to indicate an existence of several components, functions or steps, disclosed in the specification, and it is also understood that greater or fewer components, functions, or steps may likewise be utilized.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and the like.

Figure 1B:
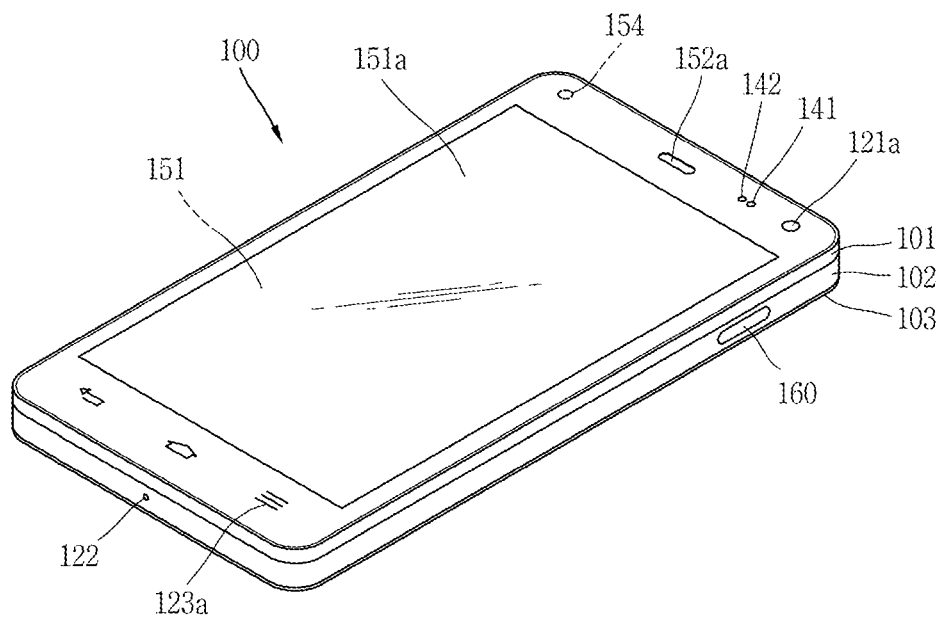
FIGS. 1B and 1C are diagrams illustrating the mobile terminal according to the present invention, when viewed from different directions.
Figure 1C:
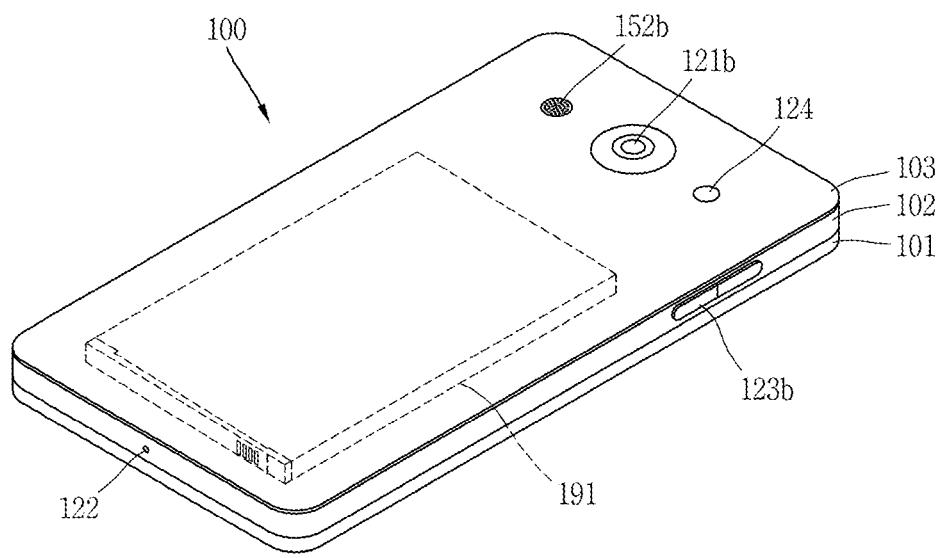

Reference is now made to FIGS. 1A-1C, where FIG. 1A is a block diagram of a mobile terminal in accordance with the present disclosure, and FIGS. 1B and 1C are conceptual views of one example of the mobile terminal, viewed from different directions.

The mobile terminal 100 is shown having components such as a wireless communication unit 110, an input unit 120, a sensing unit 140, an output unit 150, an interface unit 160, a memory 170, a controller 180, and a power supply unit 190. It is understood that implementing all of the illustrated components is not a requirement, and that greater or fewer components may alternatively be implemented.

Referring now to FIG. 1A, the mobile terminal 100 is shown having wireless communication unit 110 configured with several commonly implemented components. For instance, the wireless communication unit 110 typically includes one or more components which permit wireless communication between the mobile terminal 100 and a wireless communication system or network within which the mobile terminal is located.

The wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 typically includes one or more modules which connect the mobile terminal 100 to one or more networks. To facilitate such communications, the wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

The sensing unit 140 is typically implemented using one or more sensors configured to sense internal information of the mobile terminal, the surrounding environment of the mobile terminal, user information, and the like. For example, in FIG. 1A, the sensing unit 140 is shown having a proximity sensor 141 and an illumination sensor 142.

If desired, the sensing unit 140 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154.

The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 may provide or process information or functions appropriate for a user by processing signals, data, information and the like, which are input or output by the various components depicted in FIG. 1A, or activating application programs stored in the memory 170. As one example, the controller 180 controls some or all of the components illustrated in FIGS. 1A-1C according to the execution of an application program that have been stored in the memory 170.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

Referring still to FIG. 1A, various components depicted in this figure will now be described in more detail. Regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

The broadcast signal may be encoded according to any of a variety of technical standards or broadcasting methods (for example, Digital Video Broadcast (DVB), Advanced Television Systems Committee (ATSC), and the like) for transmission and reception of digital broadcast signals. The broadcast receiving module 111 can receive the digital broadcast signals using a method appropriate for the transmission method utilized.

Examples of broadcast associated information may include information associated with a broadcast channel, a broadcast program, a broadcast event, a broadcast service provider, or the like. The broadcast associated information may also be provided via a mobile communication network, and in this case, received by the mobile communication module 112.

The broadcast associated information may be implemented in various formats. For instance, broadcast associated information may include an Electronic Program Guide (EPG) of Digital Multimedia Broadcasting (DMB), an Electronic Service Guide (ESG) of Digital Video Broadcast-Handheld (DVB-H), and the like. Broadcast signals and/or broadcast associated information received via the broadcast receiving module 111 may be stored in a suitable device, such as a memory 170.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), EV-DO (Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE), LTE-A (Long Term Evolution-Advanced), and the like).

Examples of wireless signals transmitted and/or received via the mobile communication module 112 include audio call signals, video (telephony) call signals, or various formats of data to support communication of text and multimedia messages.

The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), Long Term Evolution (LTE), and the like. The wireless Internet module 113 may transmit/receive data according to one or more of such wireless Internet technologies, and other Internet technologies as well.

In some embodiments, when the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

In some embodiments, another mobile terminal (which may be configured similarly to mobile terminal 100) may be a wearable device, for example, a smart watch, a smart glass or a head mounted display (HMD), which is able to exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the controller 180, for example, may cause transmission of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

The location information module 115 is generally configured to detect, calculate, derive or otherwise identify a position of the mobile terminal. As an example, the location information module 115 includes a Global Position System (GPS) module, a Wi-Fi module, or both. If desired, the location information module 115 may alternatively or additionally function with any of the other modules of the wireless communication unit 110 to obtain data related to the position of the mobile terminal.

As one example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module.

The input unit 120 may be configured to permit various types of input to the mobile terminal 120. Examples of such input include audio, image, video, data, and user input. Image and video input is often obtained using one or more cameras 121. Such cameras 121 may process image frames of still pictures or video obtained by image sensors in a video or image capture mode. The processed image frames can be displayed on the display unit 151 or stored in memory 170. In some cases, the cameras 121 may be arranged in a matrix configuration to permit a plurality of images having various angles or focal points to be input to the mobile terminal 100. As another example, the cameras 121 may be located in a stereoscopic arrangement to acquire left and right images for implementing a stereoscopic image.

The microphone 122 is generally implemented to permit audio input to the mobile terminal 100. The audio input can be processed in various manners according to a function being executed in the mobile terminal 100. If desired, the microphone 122 may include assorted noise removing algorithms to remove unwanted noise generated in the course of receiving the external audio.

The user input unit 123 is a component that permits input by a user. Such user input may enable the controller 180 to control operation of the mobile terminal 100. The user input unit 123 may include one or more of a mechanical input element (for example, a key, a button located on a front and/or rear surface or a side surface of the mobile terminal 100, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the mobile terminal at a location that is other than the touch screen. On the other hand, the virtual key or the visual key may be displayed on the touch screen in various shapes, for example, graphic, text, icon, video, or a combination thereof.

The user input unit 123 may recognize information sensed by the sensing unit 140, as well as by the aforementioned mechanical input means and touch type input means, as information input from a user. Accordingly, the controller 180 can control an operation of the mobile terminal 100 corresponding to the sensed information.

The sensing unit 140 is generally configured to sense one or more of internal information of the mobile terminal, surrounding environment information of the mobile terminal, user information, or the like. The controller 180 generally cooperates with the sending unit 140 to control operation of the mobile terminal 100 or execute data processing, a function or an operation associated with an application program installed in the mobile terminal based on the sensing provided by the sensing unit 140. The sensing unit 140 may be implemented using any of a variety of sensors, some of which will now be described in more detail.

The proximity sensor 141 may include a sensor to sense presence or absence of an object approaching a surface, or an object located near a surface, by using an electromagnetic field, infrared rays, or the like without a mechanical contact. The proximity sensor 141 may be arranged at an inner region of the mobile terminal covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this case, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like).

In general, controller 180 processes data corresponding to proximity touches and proximity touch patterns sensed by the proximity sensor 141, and cause output of visual information on the touch screen. In addition, the controller 180 can control the mobile terminal 100 to execute different operations or process different data according to whether a touch with respect to a point on the touch screen is either a proximity touch or a contact touch.

A touch sensor can sense a touch applied to the touch screen, such as display unit 151, using any of a variety of touch methods. Examples of such touch methods include a resistive type, a capacitive type, an infrared type, and a magnetic field type, among others.

As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 180. Accordingly, the controller 180 may sense which region of the display unit 151 has been touched. Here, the touch controller may be a component separate from the controller 180, the controller 180, and combinations thereof.

In some embodiments, the controller 180 may execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize position information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121 typically includes at least one a camera sensor (CCD, CMOS etc.), a photo sensor (or image sensors), and a laser sensor.

Implementing the camera 121 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain position information of the physical object.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

In some embodiments, the display unit 151 may be implemented as a stereoscopic display unit for displaying stereoscopic images. A typical stereoscopic display unit may employ a stereoscopic display scheme such as a stereoscopic scheme (a glass scheme), an auto-stereoscopic scheme (glassless scheme), a projection scheme (holographic scheme), or the like.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output module 154 can output a signal for indicating an event generation using light of a light source. Examples of events generated in the mobile terminal 100 may include message reception, call signal reception, a missed call, an alarm, a schedule notice, an email reception, information reception through an application, and the like.

A signal output by the optical output module 154 may be implemented in such a manner that the mobile terminal emits monochromatic light or light with a plurality of colors. The signal output may be terminated as the mobile terminal senses that a user has checked the generated event, for example.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

When the mobile terminal 100 is connected with an external cradle, the interface unit 160 can serve as a passage to allow power from the cradle to be supplied to the mobile terminal 100 or may serve as a passage to allow various command signals input by the user from the cradle to be transferred to the mobile terminal there through. Various command signals or power input from the cradle may operate as signals for recognizing that the mobile terminal is properly mounted on the cradle.

The memory 170 can store programs to support operations of the controller 180 and store input/output data (for example, phonebook, messages, still images, videos, etc.). The memory 170 may store data related to various patterns of vibrations and audio which are output in response to touch inputs on the touch screen.

The memory 170 may include one or more types of storage mediums including a Flash memory, a hard disk, a solid state disk, a silicon disk, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in relation to a network storage device that performs the storage function of the memory 170 over a network, such as the Internet.

The controller 180 may typically control the general operations of the mobile terminal 100. For example, the controller 180 may set or release a lock state for restricting a user from inputting a control command with respect to applications when a status of the mobile terminal meets a preset condition.

The controller 180 can also perform the controlling and processing associated with voice calls, data communications, video calls, and the like, or perform pattern recognition processing to recognize a handwriting input or a picture drawing input performed on the touch screen as characters or images, respectively. In addition, the controller 180 can control one or a combination of those components in order to implement various exemplary embodiments disclosed herein.

The power supply unit 190 receives external power or provide internal power and supply the appropriate power required for operating respective elements and components included in the mobile terminal 100. The power supply unit 190 may include a battery, which is typically rechargeable or be detachably coupled to the terminal body for charging.

The power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance.

Various embodiments described herein may be implemented in a computer-readable medium, a machine-readable medium, or similar medium using, for example, software, hardware, or any combination thereof.

Referring now to FIGS. 1B and 1C, the mobile terminal 100 is described with reference to a bar-type terminal body. However, the mobile terminal 100 may alternatively be implemented in any of a variety of different configurations. Examples of such configurations include watch-type, clip-type, glasses-type, or as a folder-type, flip-type, slide-type, swing-type, and swivel-type in which two and more bodies are combined with each other in a relatively movable manner, and combinations thereof. Discussion herein will often relate to a particular type of mobile terminal (for example, bar-type, watch-type, glasses-type, and the like). However, such teachings with regard to a particular type of mobile terminal will generally apply to other types of mobile terminals as well.

The mobile terminal 100 will generally include a case (for example, frame, housing, cover, and the like) forming the appearance of the terminal. In this embodiment, the case is formed using a front case 101 and a rear case 102. Various electronic components are incorporated into a space formed between the front case 101 and the rear case 102. At least one middle case may be additionally positioned between the front case 101 and the rear case 102.

The display unit 151 is shown located on the front side of the terminal body to output information. As illustrated, a window 151a of the display unit 151 may be mounted to the front case 101 to form the front surface of the terminal body together with the front case 101.

In some embodiments, electronic components may also be mounted to the rear case 102. Examples of such electronic components include a detachable battery 191, an identification module, a memory card, and the like. Rear cover 103 is shown covering the electronic components, and this cover may be detachably coupled to the rear case 102.

Therefore, when the rear cover 103 is detached from the rear case 102, the electronic components mounted to the rear case 102 are externally exposed.

As illustrated, when the rear cover 103 is coupled to the rear case 102, a side surface of the rear case 102 is partially exposed. In some cases, upon the coupling, the rear case 102 may also be completely shielded by the rear cover 103. In some embodiments, the rear cover 103 may include an opening for externally exposing a camera 121b or an audio output module 152b.

The cases 101, 102, 103 may be formed by injection-molding synthetic resin or may be formed of a metal, for example, stainless steel (STS), aluminum (Al), titanium (Ti), or the like.

As an alternative to the example in which the plurality of cases form an inner space for accommodating components, the mobile terminal 100 may be configured such that one case forms the inner space. In this example, a mobile terminal 100 having a uni-body is formed in such a manner that synthetic resin or metal extends from a side surface to a rear surface.

If desired, the mobile terminal 100 may include a waterproofing unit (not shown) for preventing introduction of water into the terminal body. For example, the waterproofing unit may include a waterproofing member which is located between the window 151a and the front case 101, between the front case 101 and the rear case 102, or between the rear case 102 and the rear cover 103, to hermetically seal an inner space when those cases are coupled.

FIGS. 1B and 1C depict certain components as arranged on the mobile terminal. However, it is to be understood that alternative arrangements are possible and within the teachings of the instant disclosure. Some components may be omitted or rearranged. For example, the first manipulation unit 123a may be located on another surface of the terminal body, and the second audio output module 152b may be located on the side surface of the terminal body.

The display unit 151 outputs information processed in the mobile terminal 100. The display unit 151 may be implemented using one or more suitable display devices. Examples of such suitable display devices include a liquid crystal display (LCD), a thin film transistor-liquid crystal display (TFT-LCD), an organic light emitting diode (OLED), a flexible display, a 3-dimensional (3D) display, an e-ink display, and combinations thereof.

The display unit 151 may be implemented using two display devices, which can implement the same or different display technology. For instance, a plurality of the display units 151 may be arranged on one side, either spaced apart from each other, or these devices may be integrated, or these devices may be arranged on different surfaces.

The display unit 151 may also include a touch sensor which senses a touch input received at the display unit. When a touch is input to the display unit 151, the touch sensor may be configured to sense this touch and the controller 180, for example, may generate a control command or other signal corresponding to the touch. The content which is input in the touching manner may be a text or numerical value, or a menu item which can be indicated or designated in various modes.

The touch sensor may be configured in a form of a film having a touch pattern, disposed between the window 151a and a display on a rear surface of the window 151a, or a metal wire which is patterned directly on the rear surface of the window 151a. Alternatively, the touch sensor may be integrally formed with the display. For example, the touch sensor may be disposed on a substrate of the display or within the display.

The display unit 151 may also form a touch screen together with the touch sensor. Here, the touch screen may serve as the user input unit 123 (see FIG. 1A). Therefore, the touch screen may replace at least some of the functions of the first manipulation unit 123a.

The first audio output module 152a may be implemented in the form of a speaker to output voice audio, alarm sounds, multimedia audio reproduction, and the like.

The window 151a of the display unit 151 will typically include an aperture to permit audio generated by the first audio output module 152a to pass. One alternative is to allow audio to be released along an assembly gap between the structural bodies (for example, a gap between the window 151a and the front case 101). In this case, a hole independently formed to output audio sounds may not be seen or is otherwise hidden in terms of appearance, thereby further simplifying the appearance and manufacturing of the mobile terminal 100.

The optical output module 154 can be configured to output light for indicating an event generation. Examples of such events include a message reception, a call signal reception, a missed call, an alarm, a schedule notice, an email reception, information reception through an application, and the like. When a user has checked a generated event, the controller can control the optical output unit 154 to stop the light output.

The first camera 121a can process image frames such as still or moving images obtained by the image sensor in a capture mode or a video call mode. The processed image frames can then be displayed on the display unit 151 or stored in the memory 170.

The first and second manipulation units 123a and 123b are examples of the user input unit 123, which may be manipulated by a user to provide input to the mobile terminal 100. The first and second manipulation units 123a and 123b may also be commonly referred to as a manipulating portion, and may employ any tactile method that allows the user to perform manipulation such as touch, push, scroll, or the like. The first and second manipulation units 123a and 123b may also employ any non-tactile method that allows the user to perform manipulation such as proximity touch, hovering, or the like.

FIG. 1B illustrates the first manipulation unit 123a as a touch key, but possible alternatives include a mechanical key, a push key, a touch key, and combinations thereof.

Input received at the first and second manipulation units 123a and 123b may be used in various ways. For example, the first manipulation unit 123a may be used by the user to provide an input to a menu, home key, cancel, search, or the like, and the second manipulation unit 123b may be used by the user to provide an input to control a volume level being output from the first or second audio output modules 152a or 152b, to switch to a touch recognition mode of the display unit 151, or the like.

As another example of the user input unit 123, a rear input unit (not shown) may be located on the rear surface of the terminal body. The rear input unit can be manipulated by a user to provide input to the mobile terminal 100. The input may be used in a variety of different ways. For example, the rear input unit may be used by the user to provide an input for power on/off, start, end, scroll, control volume level being output from the first or second audio output modules 152a or 152b, switch to a touch recognition mode of the display unit 151, and the like. The rear input unit may be configured to permit touch input, a push input, or combinations thereof.

The rear input unit may be located to overlap the display unit 151 of the front side in a thickness direction of the terminal body. As one example, the rear input unit may be located on an upper end portion of the rear side of the terminal body such that a user can easily manipulate it using a forefinger when the user grabs the terminal body with one hand. Alternatively, the rear input unit can be positioned at most any location of the rear side of the terminal body.

Embodiments that include the rear input unit may implement some or all of the functionality of the first manipulation unit 123a in the rear input unit. As such, in situations where the first manipulation unit 123a is omitted from the front side, the display unit 151 can have a larger screen.

As a further alternative, the mobile terminal 100 may include a finger scan sensor which scans a user's fingerprint. The controller 180 can then use fingerprint information sensed by the finger scan sensor as part of an authentication procedure. The finger scan sensor may also be installed in the display unit 151 or implemented in the user input unit 123.

The microphone 122 is shown located at an end of the mobile terminal 100, but other locations are possible. If desired, multiple microphones may be implemented, with such an arrangement permitting the receiving of stereo sounds.

The interface unit 160 may serve as a path allowing the mobile terminal 100 to interface with external devices. For example, the interface unit 160 may include one or more of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121b is shown located at the rear side of the terminal body and includes an image capturing direction that is substantially opposite to the image capturing direction of the first camera unit 121a. If desired, second camera 121a may alternatively be located at other locations, or made to be moveable, in order to have a different image capturing direction from that which is shown.

The second camera 121b can include a plurality of lenses arranged along at least one line. The plurality of lenses may also be arranged in a matrix configuration. The cameras may be referred to as an "array camera." When the second camera 121b is implemented as an array camera, images may be captured in various manners using the plurality of lenses and images with better qualities.

As shown in FIG. 1C, a flash 124 is shown adjacent to the second camera 121b. When an image of a subject is captured with the camera 121b, the flash 124 may illuminate the subject.

As shown in FIG. 1B, the second audio output module 152b can be located on the terminal body. The second audio output module 152b may implement stereophonic sound functions in conjunction with the first audio output module 152a, and may be also used for implementing a speaker phone mode for call communication.

At least one antenna for wireless communication may be located on the terminal body. The antenna may be installed in the terminal body or formed by the case. For example, an antenna which configures a part of the broadcast receiving module 111 may be retractable into the terminal body. Alternatively, an antenna may be formed using a film attached to an inner surface of the rear cover 103, or a case that includes a conductive material.

A power supply unit 190 for supplying power to the mobile terminal 100 may include a battery 191, which is mounted in the terminal body or detachably coupled to an outside of the terminal body. The battery 191 may receive power via a power source cable connected to the interface unit 160. Also, the battery 191 can be recharged in a wireless manner using a wireless charger. Wireless charging may be implemented by magnetic induction or electromagnetic resonance.

The rear cover 103 is shown coupled to the rear case 102 for shielding the battery 191, to prevent separation of the battery 191, and to protect the battery 191 from an external impact or from foreign material. When the battery 191 is detachable from the terminal body, the rear case 103 may be detachably coupled to the rear case 102.

An accessory for protecting an appearance or assisting or extending the functions of the mobile terminal 100 can also be provided on the mobile terminal 100. As one example of an accessory, a cover or pouch for covering or accommodating at least one surface of the mobile terminal 100 may be provided. The cover or pouch may cooperate with the display unit 151 to extend the function of the mobile terminal 100. Another example of the accessory is a touch pen for assisting or extending a touch input to a touch screen.

The present invention relates to a stand that supports a mobile terminal. The stand includes a rod that is inserted into a mobile terminal 100 in such a manner that the rod can extend from within the mobile terminal 100.

FIGS. 2A to 2D are perspective diagrams illustrating a stand module 200 according to a first embodiment. The stand module 200 according to the first embodiment of the present invention is described below referring to FIGS. 2A to 2D. In addition, as described above, the mobile terminal 100 includes a front case 101 and a rear case 102. However, in general, a body of the mobile terminal 100 into which components are combined or assembled means the rear case 102.

The stand module 200 according to one embodiment of the present invention includes a rod 210 and a rotation control unit 250. The rod 210 is formed within the body of the mobile terminal 100 in such a manner as to extend from within the mobile terminal 100 and that supports the body of the mobile terminal 100 after extending from within the mobile terminal 100. The rotation control unit 250 is formed in such a manner as to enclose at least one portion of the rod 210 and controls rotation of the rod 210 after the rod 210 extends from within the mobile terminal 100. The rod 210 includes a first rod 211 and a second rod 215 that are formed within the body of the mobile terminal 100, and a hinge portion 213 connecting between the first rod 211 and the second rod 215. One end of the first rod 211 is combined with the rotation control unit 250. The second rod 215 is exposed to the outside at the surface of the body of the mobile terminal after extending from within the mobile terminal 100. The second rod 215 rotates about a central axis of the hinge portion 213 with respect to the first rod 211.

The rotation control unit 250 is configured to include a body 251 that comes into contact with the rod 210 in a sliding manner, and a wing portion 253 that is provided to one side of the body 251 and that is to be combined with the body of the mobile terminal 100. The body 251 is in the form of a polygon when viewed from the outside so that the body 251 can be easily combined with the body of the mobile terminal 100.

The stand module further includes a guide portion 255 that protrudes to the outside from one side of the body 251. The guide portion 255, when coming into contact with the body of the mobile terminal 100, limits movement of the body 251. The guide portion 255 is inserted into the body of the mobile terminal 100 to perform a function of preventing the rotation control unit 250 from moving. A combination hole 254 is formed on the wing portion formed on one side of the rotation control unit 250. A combination member 357 (refer to FIG. 3E) or the like passes through the combination hole 254 to fasten the rotation control unit 254 to the body of the mobile terminal 100.

A movement limiting portion 212 that has a larger cross-sectional area than the first rod is formed on an lower end of the first rod 211, and an insertion portion 213 is provided on an outer circumferential surface of the movement limiting portion 212. The insertion portion 213 is inserted into a groove 252 formed in an outer circumferential surface of the body 251 to control the rotation of the rod 210. The movement limiting portion 212 and the insertion portion 213 are in the form of approximately a circle and in the form of approximately a rectangle, respectively, but are not necessarily limited to these forms, respectively. That is, as long as the movement limiting portion 212 has a smaller circular cross-sectional area than the body 251 the body 251, the movement limiting portion 212 is not necessarily in cylindrical form. The insertion portion 213 also is not necessarily in rectangular form. If the insertion portion 213 protrudes from an outer circumferential surface of the first rod 211, this is sufficient to control the rotation of the rod 210. However, the groove 252 that corresponds to the insertion portion 213 in terms of a form has to be formed in the body 251.

According to the first embodiment of the present invention, the outer circumferential surface of the rod 210 is configured to have at least one flat surface 211*a* or 211*b* along an axial direction, and an inner circumferential surface of the body 251 corresponds to the outer circumferential surface of the rod 210 in terms of a form. This configuration enables the rod 210 to moves along the inner circumferential surface of the body 251. A space 211*c* is formed on the end of the first rod 211 to easily combine the first rod 211 and the second rod 215 with each other. Thus, one end portion of the second rod 215 is inserted into the space 211*c* and the hinge 214 holds the end portion of the second rod 215 in place.

If a cross section of the rod 210 along the axial direction is in circular form and an internal hole in the rotation control unit 250 is in cylindrical form, the rod 210 freely rotates with respect to the inner circumferential surface. The insertion portion 252 and the groove 252 are formed to prevent this free rotation. However, the stand module 200 can be more firmly fixed to the body of the mobile terminal 100 by forming the rotation control unit 250 and the rod 210 flat in such a manner that contact surfaces of the rotation control unit 250 and the rod 210 are flat.

Figure 2A:
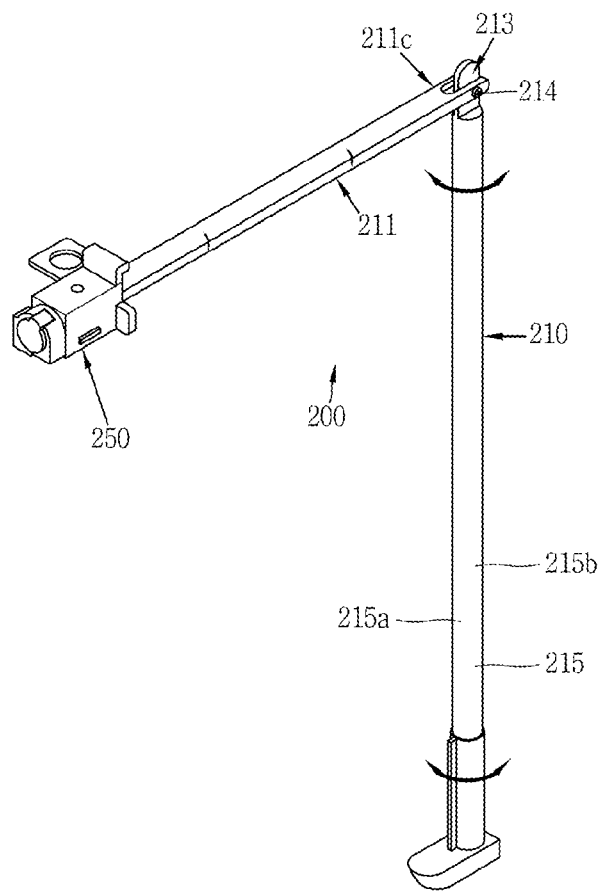
FIGS. 2A to 2D are perspective diagrams illustrating a stand module according to a first embodiment of the present invention.
Figure 2B:
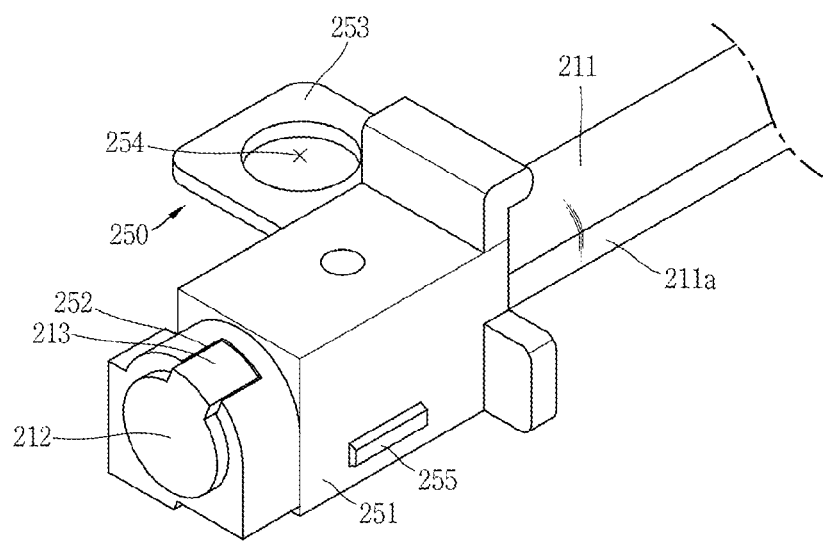
Figure 2C:
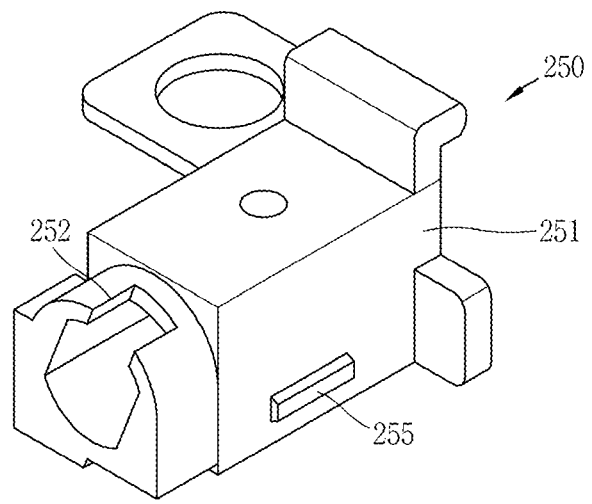
Figure 2D:
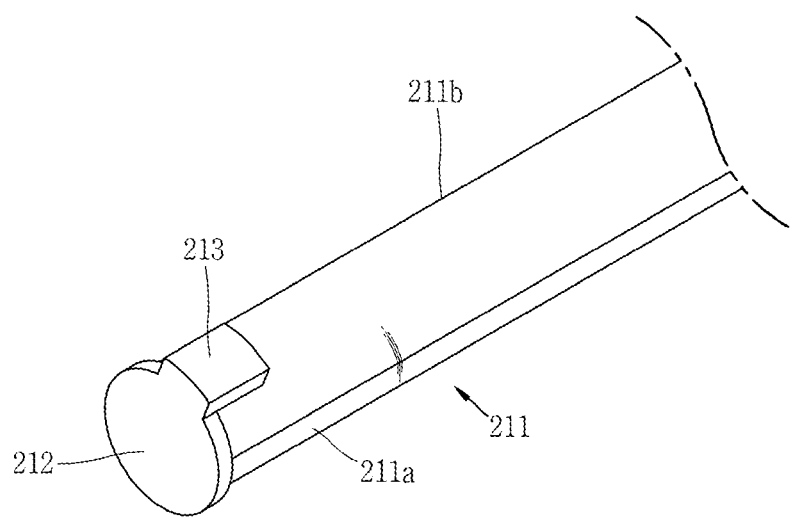

Referring to FIGS. 2B to 2D, both flank surfaces of the first rod 211 are configured to be the flat surfaces 211*a* and 211*b* along the axial direction, with curved surfaces in between. The internal hole in the body 251 is formed in the same manner as the first rod 211. Furthermore, of course, a cross sectional of the rod 210 may be in polygonal shape form.

Stand modules according to other embodiments are described below. Constituent elements that have identical or similar functions to those of the constituent elements according to the first embodiment are given reference numerals, and detailed descriptions of such constituent elements are omitted when determined as being unnecessary. The constituent elements that are not described are the same as those according to the first embodiment.

A stand module according to a second embodiment of the present invention is described referring to FIGS. 3A to 3E. Only constituent elements that distinguish the second embodiment from the first embodiment are described below.

According to the second embodiment, a movement limiting portion 312 that has at least one flat surface 312a or 312b along the axial direction and that has a larger cross-sectional area than a rod 310 is formed on a lower end of a first rod 311, and a body 351 has a rotation prevention portion 356 that protrudes toward the outside to contact to the flat surface 312a or 312b. The number of the rotation prevention portions 356 corresponds to the number of the flat surfaces 312 and 312b. Wing portions 353 and 354 and a stopping portion 355 according to the second embodiment also are the same as those according to the first embodiment. The wing portion 353 is combined with the body of the mobile terminal 100, with a combination member 357. The same is true for the following embodiments.

A cross section of the rod 310 according to the second embodiment may be in circular form. Both flank surfaces of the movement limiting portion 312 are configured to be flat surfaces 312a and 312b with curved surface in between. The flat surfaces 312a and 312b come into contact with the two rotation prevention portions 356, respectively, to prevent the rotation of the rod 310.

Figure 3A:
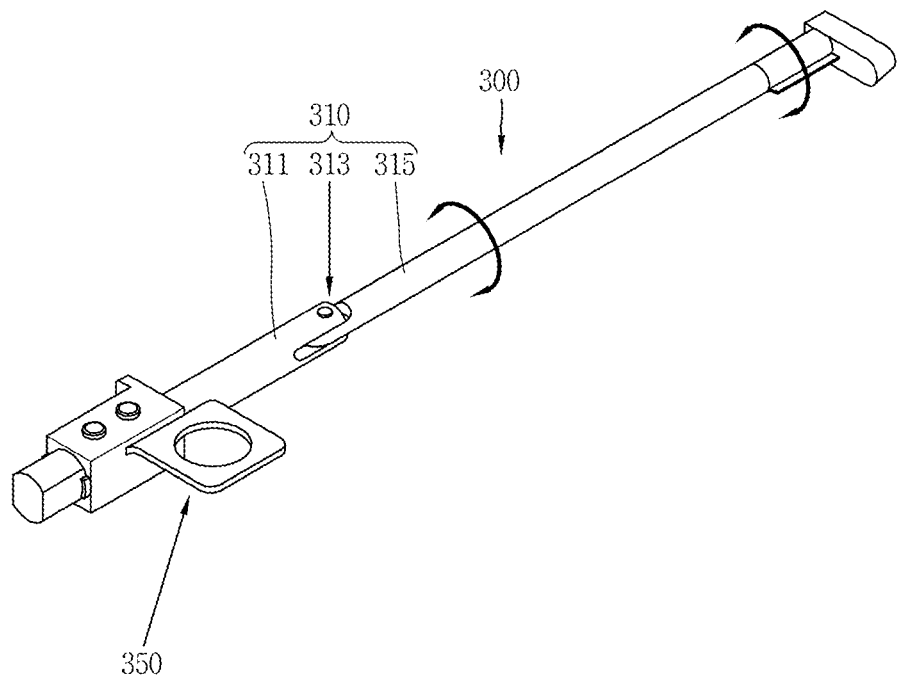
FIGS. 3A to 3E are perspective diagrams illustrating a stand module according to a second embodiment of the present invention.
Figure 3B:
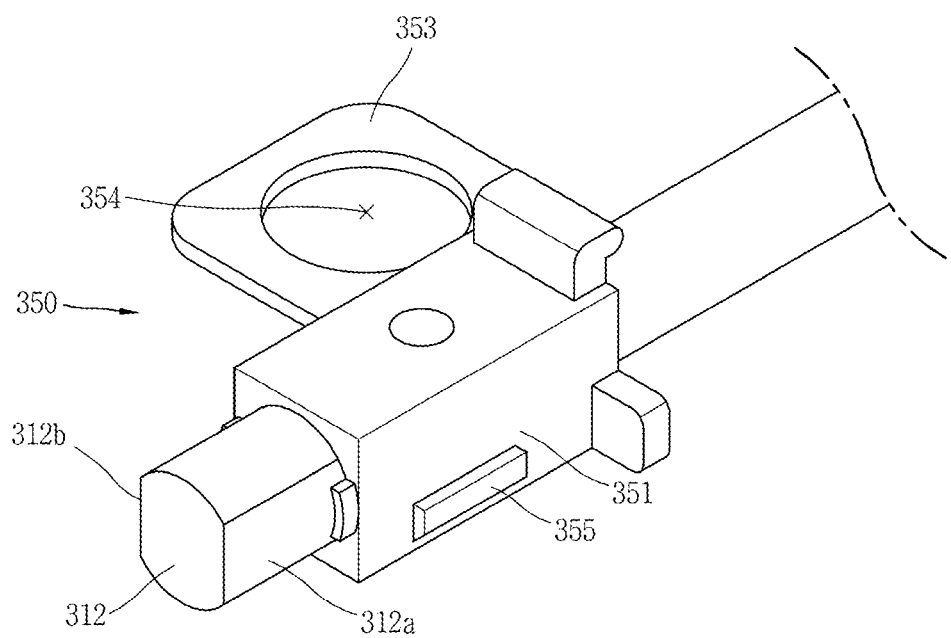
Figure 3C:
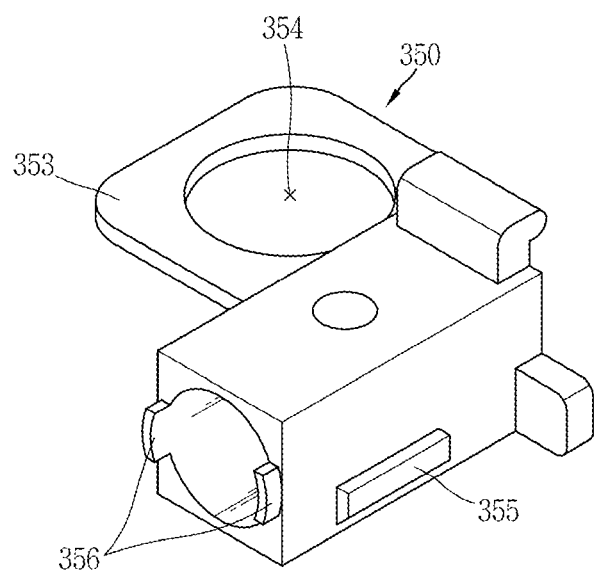
Figure 3D:
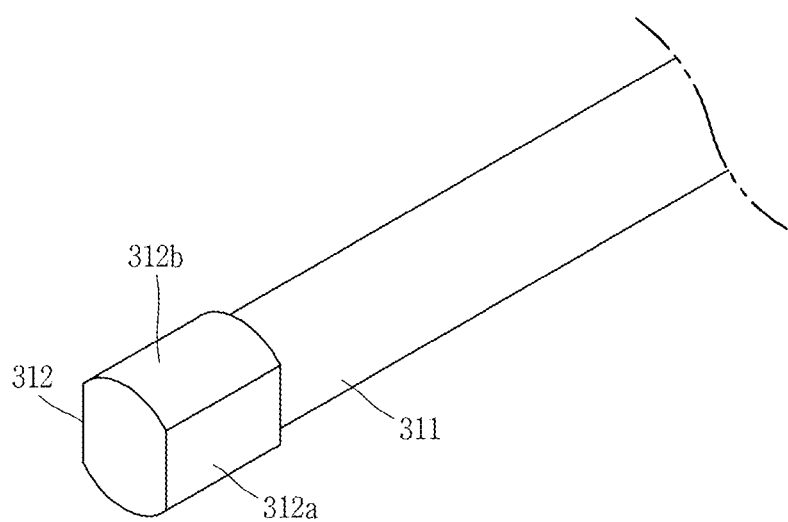
Figure 3E:
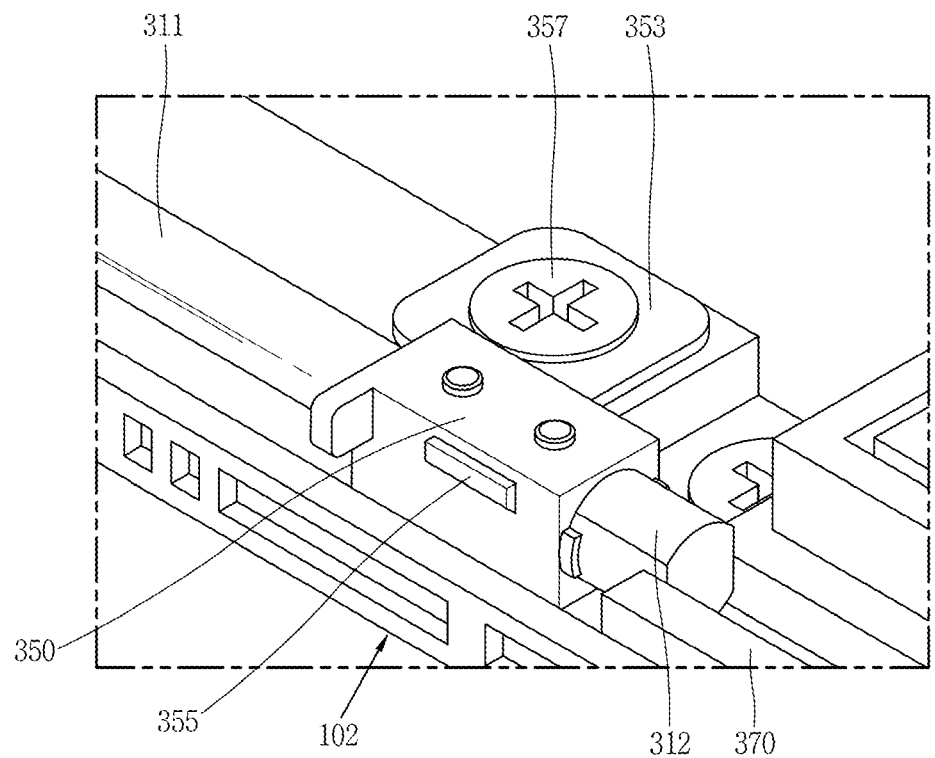
Figure 4A:
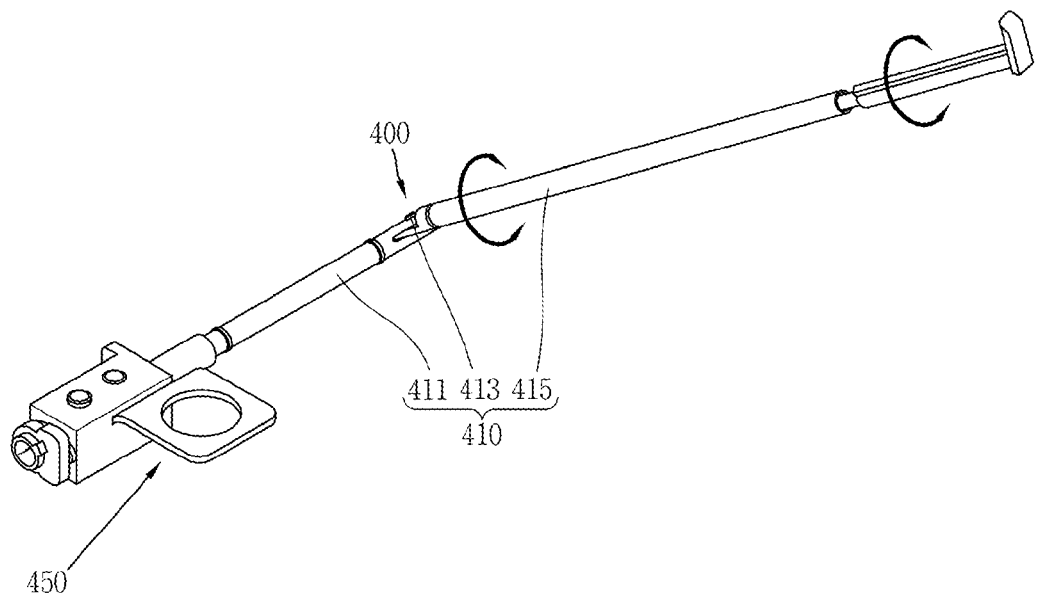
FIGS. 4A to 4D are perspective diagrams illustrating a stand module according to a third embodiment of the present invention.
Figure 4B:
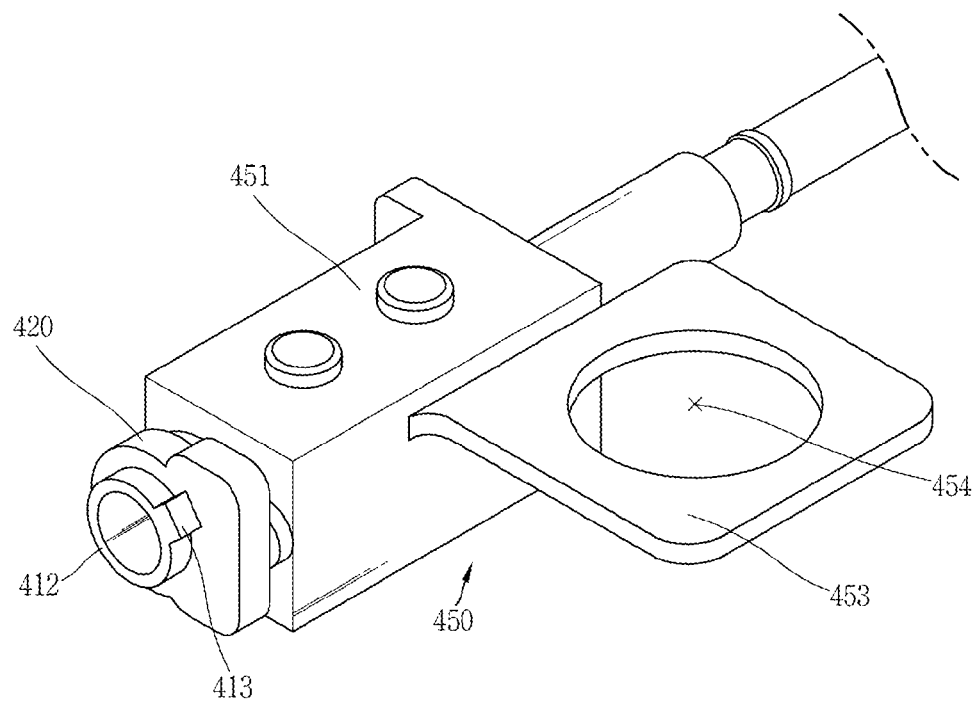
Figure 4C:
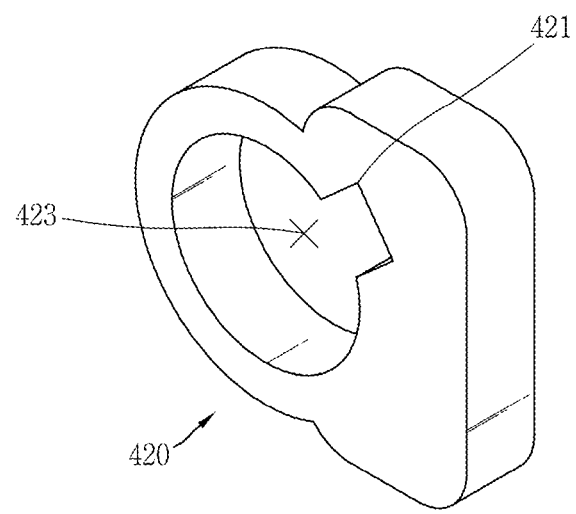
Figure 4D:
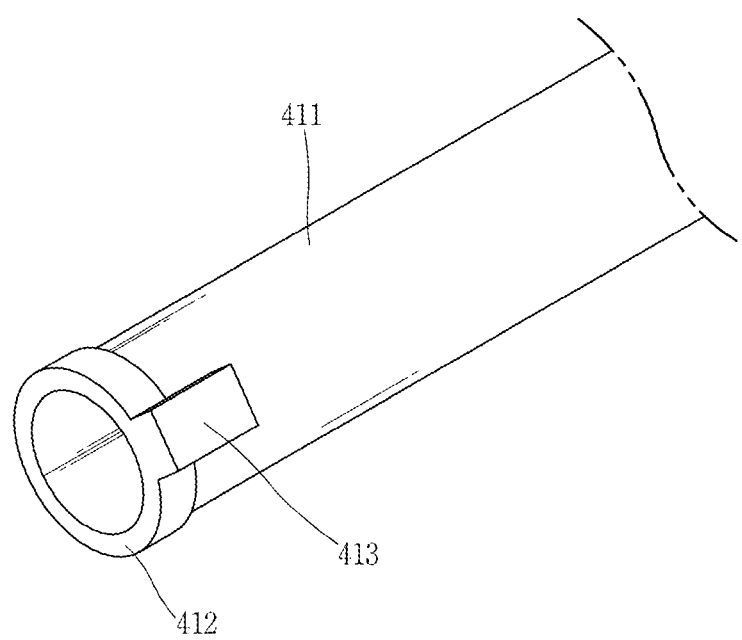
Figure 5A:
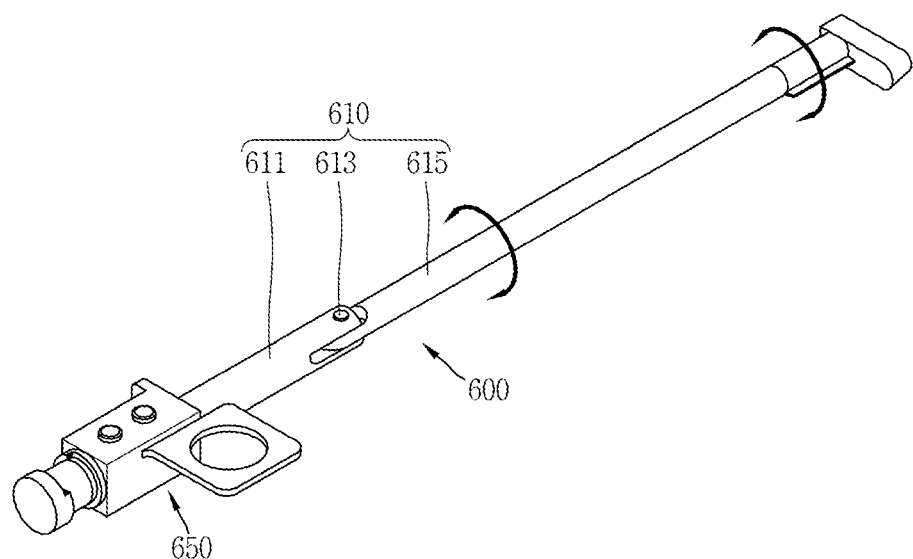
FIGS. 5A to 5D are perspective diagrams illustrating a stand module according to a fourth embodiment of the present invention.
Figure 5B:
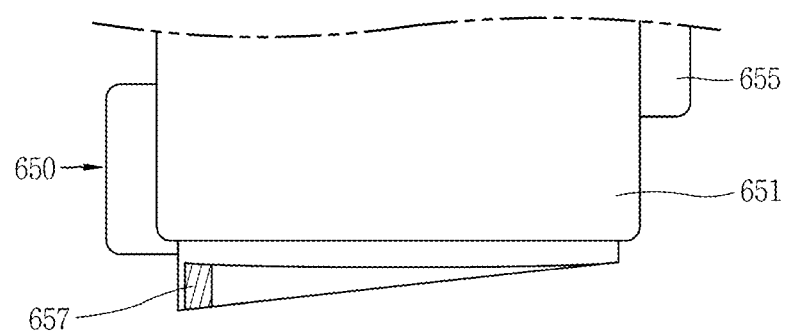
Figure 5C:
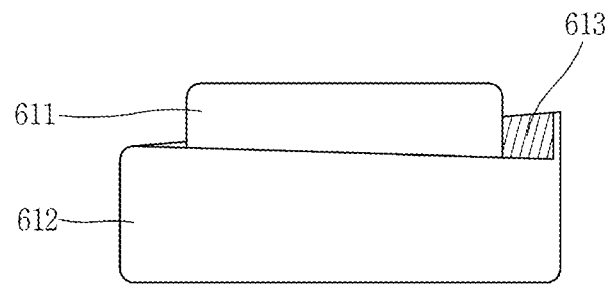
Figure 5D:
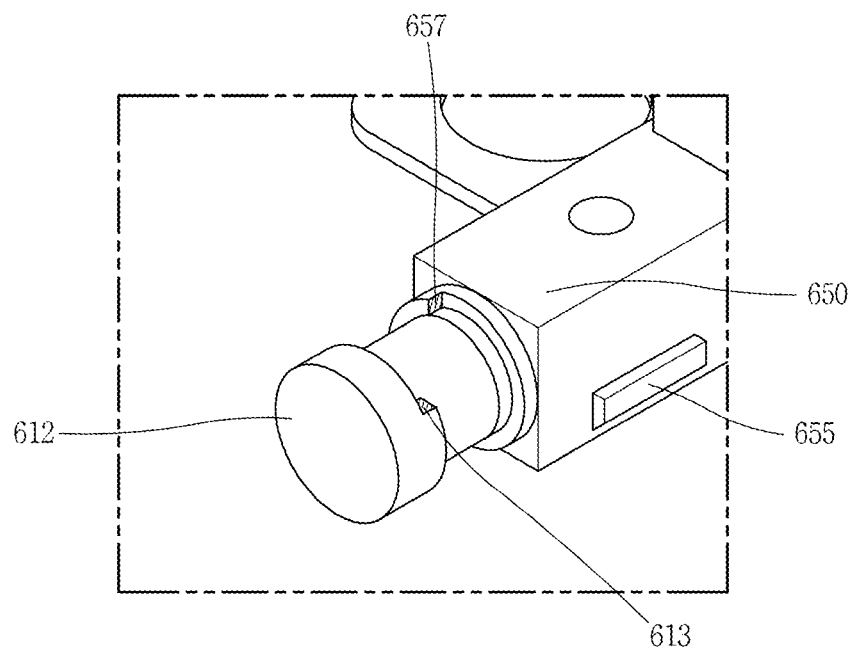

A mating member of the body of the mobile terminal 100 may be configured in such a manner that the movement limiting portion 312 is inserted. FIG. 3E illustrates that a stand module according to the second embodiment is combined with the rear case 102. It is seen from FIG. 3E that the mating member 370 that has a flat surface is also formed on the body of the mobile terminal 100 in order to hold the movement limiting portion 312 in place.

The cross section of the rod 310 is in circular form, according to the second embodiment, but is not necessarily limited to this. An outer circumferential surface of the rod 310 may have at least one flat surface, as is the case with first embodiment, and an internal hole in a rotation control unit 350 may be formed in the same manner as the rod 310.

A stand module according to a third embodiment of the present invention is described below referring to FIGS. 4A to 4D. Only constituent elements that distinguish the third embodiment from the first embodiment are described below. The constituent elements that are not described are the same as those according to the first embodiment.

According to the third embodiment, the stand module further includes a rotation prevention member 420 that is arranged between the body 451 and a movement limiting portion 412 on an outer circumferential surface of the rod 410 and that has a groove 421 that corresponds to a protrusion 413 in terms of a form. The movement limiting portion 412 that has a larger cross-sectional area than the rod 410 is provided on a lower end of the rod 410 and the protrusion 413 is formed on one portion of an outer circumferential surface of the movement limiting portion 412.

According to the third embodiment, the movement limiting portion 412 and the rotation prevention member 420 are provided in order to control rotation of the rod 410. The movement limiting portion 412 in the form of a ring is formed on the lower end of the rod 410. The movement limiting portion 412 has the protrusion 413 that protrudes as is the case with first embodiment. The protrusion 413 is inserted into the groove 421 in the rotation prevention member 420 and is held in place in the groove 421. Accordingly, the free rotation of the rod 410 is limited. According to the third embodiment, a cross section of the rod 410 is illustrated as being in circular formed as is the case with the second embodiment, but the rod 410 may be formed in such a manner that an outer circumferential surface of the rod 410 has at least one flat surface. A through hole 423 is formed within the rotation prevention member 420 and the rod 410 is inserted into the through hole 423.

A stand module according to a fourth embodiment is described below referring to FIGS. 5A to 5D. Only constituent elements that distinguish the fourth embodiment from the first embodiment are described below. The constituent elements that are not described are the same as those according to the first embodiment.

According to the fourth embodiment, a movement limiting portion 612 that has a larger cross-sectional area than the rod 610 is formed on a lower end of a rod 610, a spiral-shaped first portion 613 is formed, along the outer circumferential surface of the rod 610, on the movement limiting portion 612, and a second spiral-shaped guide portion 657 that is to be engaged with the first spiral-shaped guide portion 613 is formed on a lower end of the body 651.

The direction in which the first spiral-shaped guide portion is inclined is opposite to the direction in which the second spiral-shaped guide portion is inclined. Concentrical inclination-starting point and concentrical inclination-ending point of each of the first and second spiral-shaped guide portions is on a vertical line when viewed from the front. A vertical distance between the concentrical inclination-starting point and the concentrical inclination-ending point varies with an angle of concentrical inclination and is determined in advance and. When heads of the first and second spiral-shaped guide portions come into contact with each other, the first and second spiral-shaped guide portions take on a cylindrical shape. When the heads of the first and second spiral-shaped guide portions come into contact with each other, the rotation of the rod 610 is limited. According to the fourth embodiment, because a cross section of the rod 610 along the axial direction is in circular form and an internal hole in the body 651 is in cylindrical form, the rod 210 can freely rotate within the rotation control unit 650.

More specifically, when the first rod 611 comes into contact with the rotation control unit 650 while extending from within the mobile terminal 100, the first rod 610 is caused to rotate while extending. Then, the first rod 611 that rotates is stopped and stays fixed at an angle that is determined by the contact of the first spiral-shaped guide portion 613 and the second spiral-shaped guide portion 657. At this time, the first spiral-shaped guide portion 613 and the second spiral-shaped portion can rotate in the same direction without being limited, but when the first spiral-shaped guide portion 613 and the second spiral-shaped portion come into contact with each other, their rotation in the opposite direction is limited.

According to the first and fourth embodiments, the combination of the rods 210, 310, 410, and 610 and the rotation control units 250, 350, 450, and 650 in the fixed manner fix angles that the second rods 215, 315, 415, and 615 make with respect to the mobile terminal 100, respectively. That is, according to the first and fourth embodiments, when the rods 210, 310, 410, and 610 extends from within the mobile terminal 100, the rod 211, 311, 411, and 611 and the rotation control units 250, 350, 450, and 650 come into contact with each other, thereby limiting the rotation of the rod 210, 310, 410, and 610, respectively. As a result, the angles that the second rods 215, 315, 415, and 615, which are exposed to the outside, make with respect to the mobile terminal 100 are fixed.

When, as described above, the angles that the second rods 215, 315, 415, and 615 make with respect to the mobile terminal 100 are fixed, this may cause the inconvenience to the user. A configuration in which the user conveniently changes the angles that the second rods 215, 315, 415, and 615 make with respect to the mobile terminal 100 is described below.

Figure 6A:
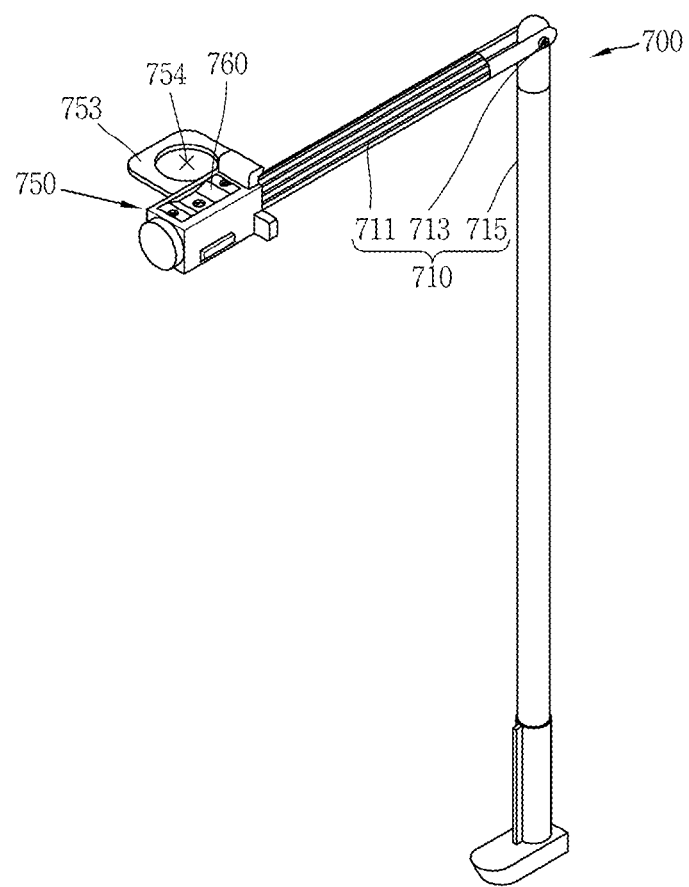
FIGS. 6A to 6C are perspective diagrams illustrating a stand module according to a fifth embodiment of the present invention.
Figure 6B:
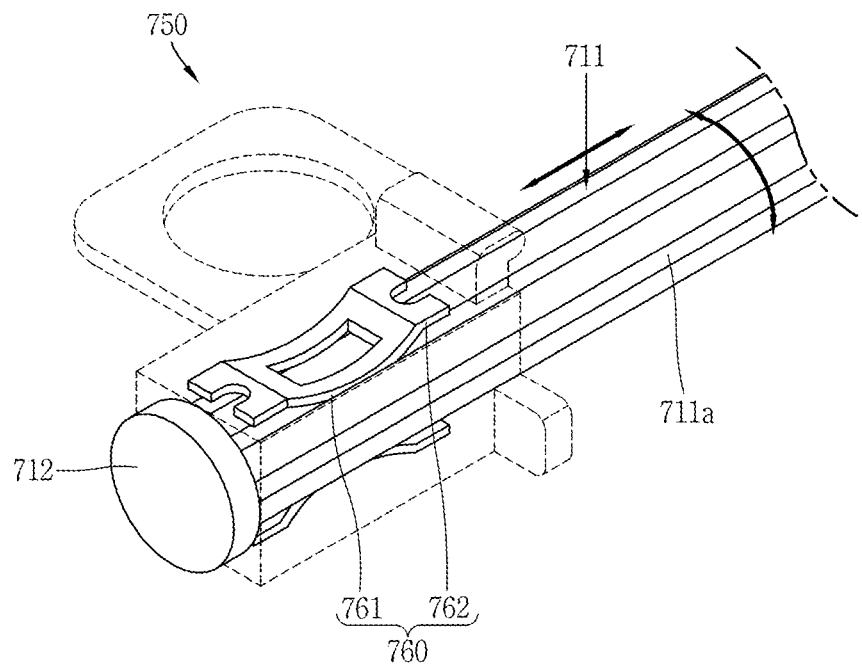
Figure 6C:
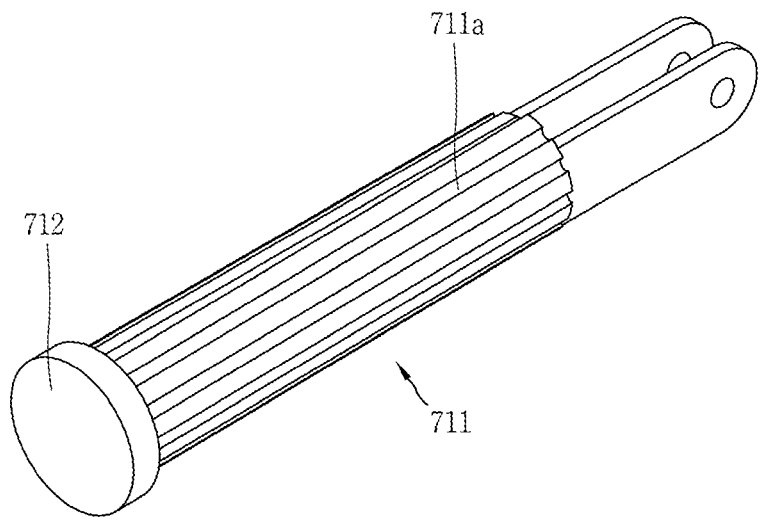
Figure 7A:
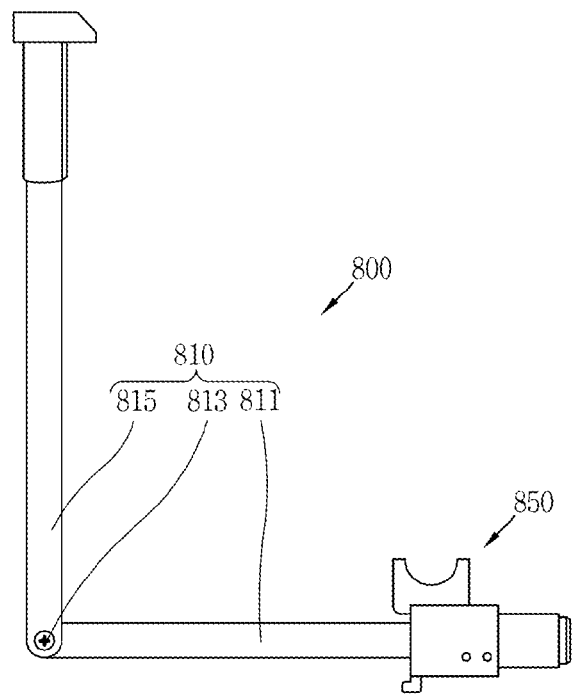
FIGS. 7A to 7E are perspective diagrams illustrating a stand module according to a sixth embodiment of the present invention.
Figure 7B:
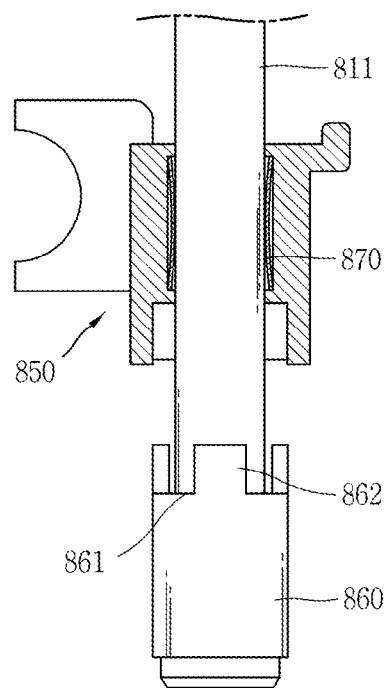
Figure 7C:
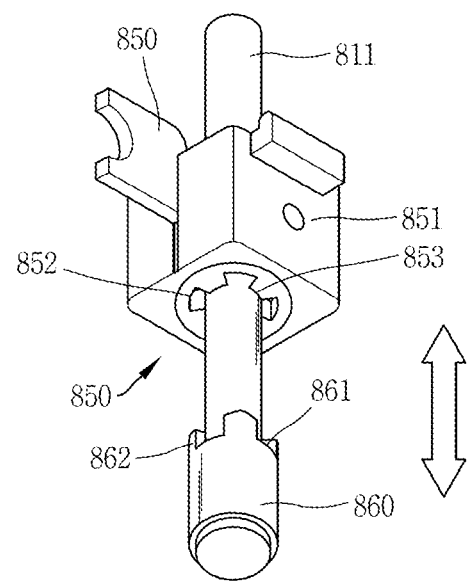
Figure 7D:
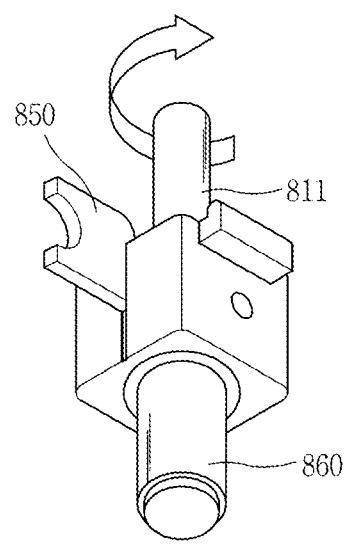
Figure 7E:
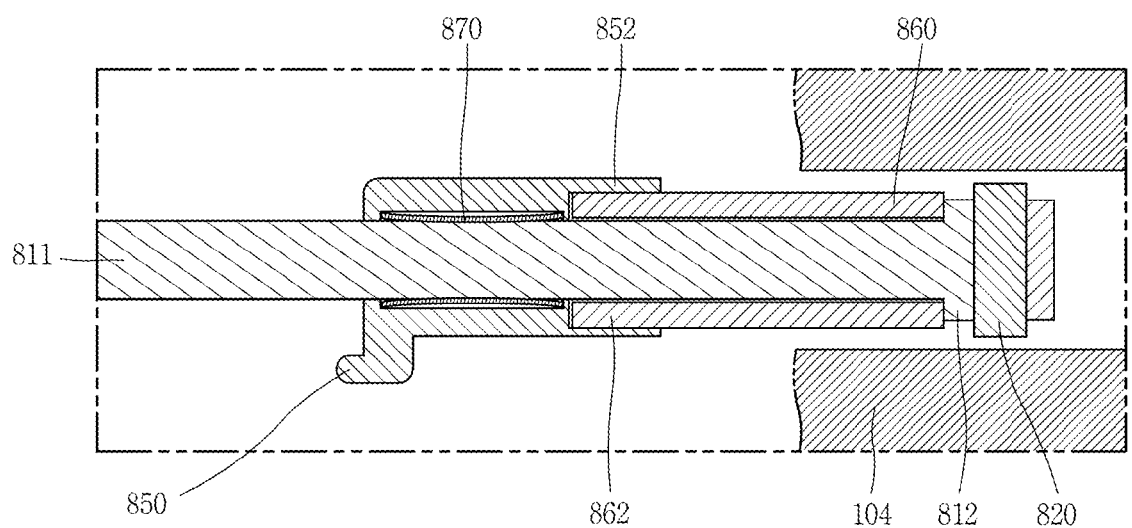

A stand module according to a fifth embodiment of the present invention is described below referring to FIGS. 6A to 6C. Only constituent elements that distinguish the fifth embodiment from the first embodiment are described below.

The constituent elements that are not described are the same as those according to the first embodiment.

According to a fifth embodiment, a structure is proposed in which a first rod 711 can rotate within a rotation control unit 750. To do this, multiple grooves 711a are formed in an outer circumferential surface of the first rod 711 in the axial direction. One or more locking member 760 are further provided within the rotation control unit 750. The locking member 760, when inserted into the groove 711a, limits the rotation of the rod 710. The locking member 760 is configured to include a support portion 762 and one or more locking portions 761. The support portion 762 has elasticity and is supported by being inserted into the rotation control unit 750. The protrusions portion 761 in convex shape faces the groove 711a. The inserting of the locking portion 761 into the groove 711a limits the rotation of the rod 710. When the rod 710 is forced to rotate, because the locking member 760 has the elasticity, the locking portion moves to be inserted into the next groove 711a adjacent to the groove 711 into which the locking portion is first inserted, thereby preventing the rotation of the rod 710.

In this manner, the use of the locking member 760 makes it possible to make an adjustment to incline the mobile terminal 100 to an angle that the user wants. If the groove 711a is formed in the first rod 711, this is sufficient to prevent the rotation of the rod 719 and thus, there is no need to form the groove 711a in the second rod 715. In addition, only one locking portion 761 may be formed in the locking member 760 and may be inserted into only one groove 711a in order to be held in place. However, two or more locking members 761 may be formed and may be inserted into the two grooves 711a at the same time.

According to the fifth embodiment, an inclination angle of the mobile terminal 100 can be changed depending on the user's preference. However, the inclination angle may be discontinuously adjusted depending on a position in which the groove 711a is formed.

According to a sixth embodiment of the present invention, a friction member is provided within a rotation control unit 850 in order for a second rod 815 to seamlessly make different angles with respect to the mobile terminal 100. A description is provided referring to FIGS. 7A to 7E. Only constituent elements that distinguish the sixth embodiment from the first embodiment are described below. The constituent elements that are not described are the same as those according to the first embodiment.

According to the sixth embodiment, a friction member is inserted into the friction member 870 such as a friction spring that has strong frictional force. Accordingly, the rod 810 rotates with the friction member 870 exerting the friction force against the rod 810. This produces the same effect as when the friction member 870 is forced to be inserted. One example of the friction member 870 is a friction spring in the form of a cylinder that is made of metal.

According to any of the embodiments described above, the rotation control unit 850 may be fixed to the rod 810. However, according to the sixth embodiment, in order to limit the rotation of the rod 810, the rotation control unit 850 and the movement limiting portion 860 enclosing the rod 810 are combined with each other using a method in which a convex and a concave come into and out of engagement. That is, in order to control the rotation of the rod 810, a wing portion of the rotation control unit 850 is fixed to the body of the mobile terminal, and the movement limiting portion 860 is combined with the rotation control unit 850. Although the rod 810 positioned within the rotation control unit 860 needs some torque to overcome the frictional force exerted by the friction member 870, the rod 810 can rotate depending on the user's preference.

A lower end of the rotation control unit 850 is combined with a movement limiting portion 860 that is formed on a lower end of the rod 810, in order to be held in place, a convex portion 853 formed on the lower end of the rotation control unit 850 is combined with a concave portion formed on the movement limiting portion 860. At the same, a concave portion 852 of the rotation control unit 850 is combined with a convex portion 862 of the movement limiting portion 860. Thus, in order to be held in place, the rotation control unit 850 and the movement limiting portion 860 are combined with each other using the method in which a convex and a concave come into and out of engagement. That is, according to the sixth embodiment, in order to combine the rod 810 and the rotation control unit 850 with each other, the convex portions 853 and 862 and the concave portions 852 and 861 are combined with each other, respectively, using the method in which a convex and a concave comes into and out of engagement. At this point, the rotation control unit 850 moves the rod 810 and is combined with the movement limiting portion 860 using the method in which convex and concave portions come into engagement.

With the configuration described above, the user can control the torque, feeling a sense of clicking.

A vibration reduction member 820, which has a larger cross-sectional area than the movement limiting portion 860, may be provided on a lower end of the movement limiting portion 860. The vibration reduction member 820 reduces vibration. That is, in a case where a stand module 800 vibrates, a lower end of a first rod 811 comes into contact with a frame 104 of the mobile terminal 100 and thus alleviates the vibration. According to the embodiment of the present invention, as a material of the vibration reduction member 820, polyoxymethylene (POM) is used.

With the configuration described above, the user can seamlessly rotate the second rod 815 in such a manner that the second rod 815, which is exposed to the outside, seamlessly makes different angles with respect to the mobile terminal 100.

According to the first to sixth embodiments, the angle that each of the rods 210, 310, 410, 610, 710, and 810, which are exposed to the outside, make with respect to the mobile terminal 100 is determined by rotating each of the rods 210, 310, 410, 610, 710, and 810 with respect to one end of each of the rods 210, 310, 410, 610, 710, and 810, respectively. However, according to one embodiment of the present invention, the mobile terminal 100 is supported by rotating a rod with respect to both ends of the rod.

Figure 8A:
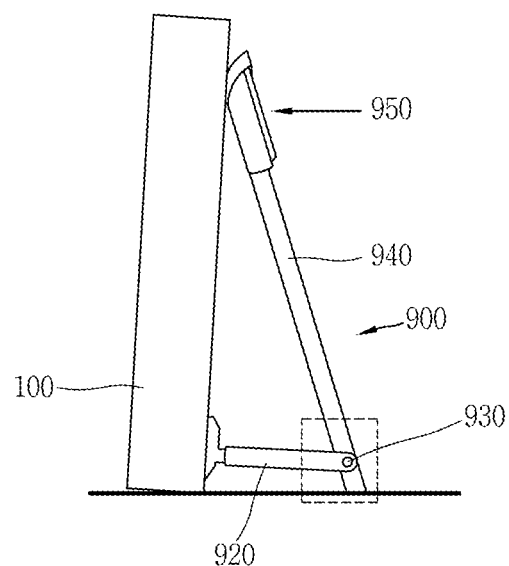
FIGS. 8A to 8C are perspective diagrams illustrating a stand module according to a seventh embodiment of the present invention.
Figure 8B:
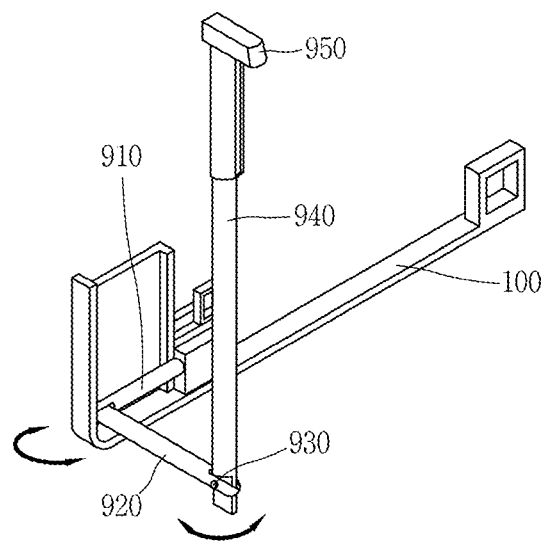
Figure 8C:
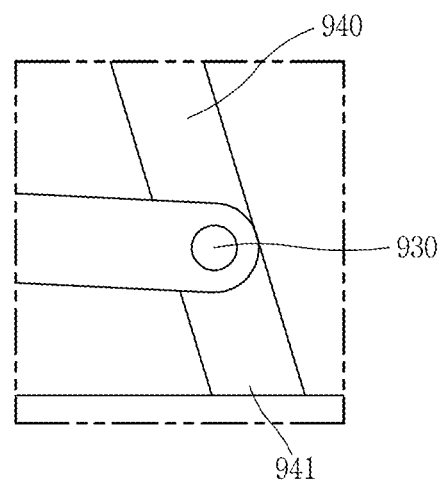

A stand module 900 with a two-junction structure according to a seventh embodiment is described below referring to FIGS. 8A to 8C.

The stand module 900 according to the seventh embodiment is realized by adding a hinge portion 930 and a third rod 940 to any one of the stand modules 200, 300, 400, 600, 700, and 800.

According to the first to sixth embodiments, only the second rods 215, 315, 415, 615, 715, and 815 are exposed to the outside to support the mobile terminal 100. However, according to the seventh embodiment, the stand module 900 additionally includes the third rod 940 that is connected to a second rod 920 with a hinge 930 and one end of which comes into contact with a rear side of the body of the mobile terminal 100 and the other end of which comes into contact with a supporting object.

According to the seventh embodiment, the mobile terminal is supported not only by the second rod 920, but also by the third rod 940. At this point, when the other end 941 of the third rod 940 is flat, the third rod 940 is more stably supported by the supporting object. In a case where the other end 941 is flat, the extent to which the mobile terminal 100 is inclined is controlled according to an angle at which the surface of the other end 941 is inclined with the third rod 940. That is, in a case where the rod 920 and the third rod 940 are the same in length, the greater an acute angle that the surface of the other end 941 makes with respect to the third rod 940, the smaller an angle that the mobile terminal 100 makes with respect to the supporting object.

In addition, according to one embodiment of the present invention, vibration that is produced when the user flicks the second rod 920 (the third rod 940 according to the seventh embodiment) that is exposed to the outside can be used when running a game application that is embedded in the mobile terminal 100. More particularly, when playing a game in which a slingshot is used, by producing the vibration with the second rod 920, the user can input the degree to which a thin band of rubber is pulled.

Figure 9:
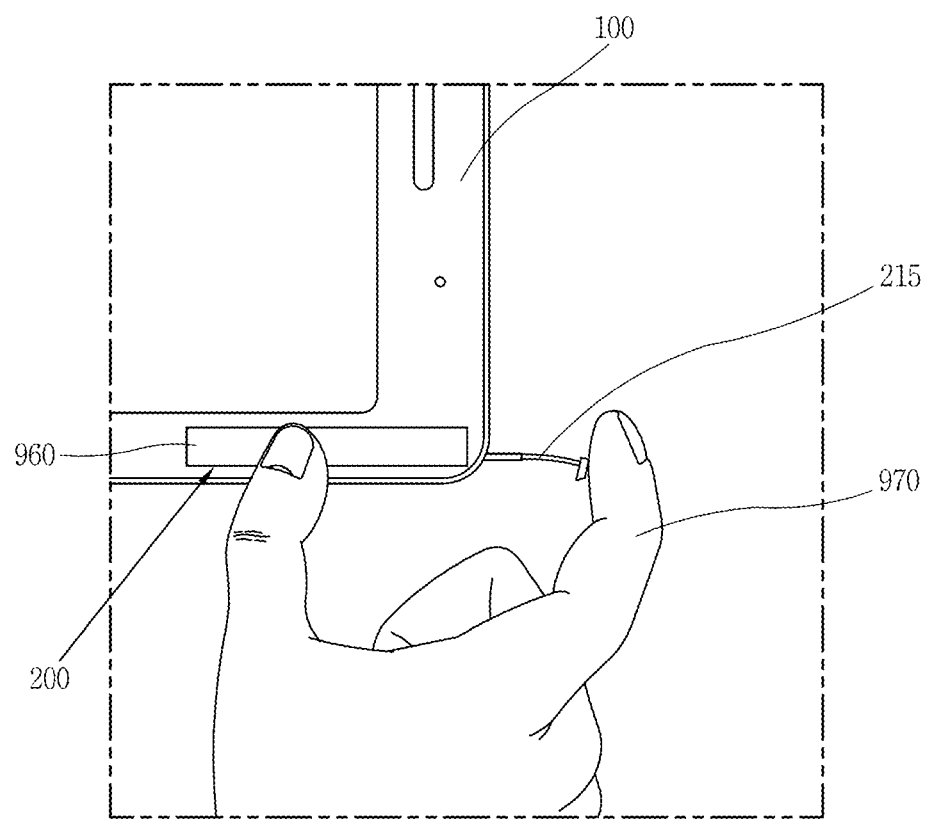
FIG. 9 is a diagram illustrating a stand module equipped with a vibration sensor according to one embodiment of the present invention.

To do this, as illustrated in FIG. 9, a vibration sensor 960 is provided to each of the stand modules 200, 300, 400, 600, 800, and 900. The vibration sensor 960 detects the vibration that is produced when each of the second rods 215, 315, 415, 615, 715, and 915 is flicked.

In addition, the stand modules 200, 300, 400, 600, 700, 800, and 900 are mainly described above as functioning as a stand supporting the mobile terminal 100 when viewing an image, but the stand modules 200, 300, 400, 600, 700, 800, and 900 may function as a DMB antenna.

To do this, according to the embodiments, a space into which an existing rod-type antenna is inserted is set to be a space into which the stand module is inserted.

Various embodiments may be implemented using a machine-readable medium having instructions stored thereon for execution by a processor to perform various methods presented herein. Examples of possible machine-readable mediums include ROM, RAM, CD-ROM, a magnetic tape, a floppy disk, an optical data storage device, the other types of storage mediums presented herein, and combinations thereof. If desired, the machine-readable medium may be realized in the form of a carrier wave (for example, a transmission over the Internet). The processor may include the controller 180 of the mobile terminal.

The foregoing embodiments and advantages are merely exemplary and are not to be considered as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds are therefore intended to be embraced by the appended claims.

What is claimed is:

1. A stand module comprising:
   a rod formed in a body of a mobile terminal so as to extend from the body of the mobile terminal, and supporting the body of the mobile terminal when the rod extends from the body of the mobile terminal; and
   a rotation control unit that controls rotation of the rod after the rod extends from the body of the mobile terminal,
   wherein the rod includes:
   a first rod formed in the body of the mobile terminal, the first rod having one end combined with the rotation control unit;
   a second rod exposed to the outside of the body of the mobile terminal when extending from the mobile terminal; and
   a hinge portion that connects the first rod and the second rod with each other, and that serves as an axis about which the second rod rotates with respect to the first rod.

2. The stand module of claim 1, wherein the rotation control unit includes a body that comes into contact with an outer circumferential surface of the rod in a sliding manner, and a wing portion that is provided at one side of the body and that is to be combined with the body of the mobile terminal.

3. The stand module of claim 2, further comprising a guide portion that is formed on one side of the body to protrude to the outside from one side of the body and that, when coming into contact with the body of the mobile terminal, limits movement of the body.

4. The stand module of claim 3, wherein a movement limiting portion that has a larger cross-sectional area than the first rod is formed on one end of the first rod, and an insertion portion is provided on the movement limiting portion,
   wherein the insertion portion is inserted into a groove formed in an outer circumferential surface of the body to control rotation of the rod.

5. The stand module of claim 3, wherein the outer circumferential surface of the rod is formed to have at least one or more flat surfaces along an axial direction,
   wherein an inner circumferential surface of the body has a shape corresponding to the outer circumferential surface of the rod.

6. The stand module of claim 3, wherein a movement limiting portion that has at least one flat surface along an axial direction and that has a larger cross-sectional area than the first rod is formed on a lower end of the first rod, and the body has a rotation prevention portion that protrudes toward the outside to contact to the flat surface.

7. The stand module of claim 6, wherein the body of the mobile terminal has a mating member with a flat surface that the movement limiting portion brings into contact with in order to be held in place.

8. The stand module of claim 3, wherein the movement limiting portion that has a larger cross-sectional area than the rod is provided on a lower end of the rod,
  wherein a protrusion is formed on one portion of an outer circumferential surface of the movement limiting portion, and
  wherein the stand module further comprises a rotation prevention member that is arranged between the body and the movement limiting portion on an outer circumferential surface of the rod, the rotation prevention member having a groove corresponding to the protrusion.

9. The stand module of claim 3, wherein a movement limiting portion that has a larger cross-sectional area than the rod is formed on one end of the rod,
  wherein a first spiral-shaped portion is formed along an outer circumferential surface of the rod on the movement limiting portion,
  wherein a second spiral-shaped guide portion that is to be engaged with the first spiral-shaped guide portion is formed on one end of the body.

10. The stand module of claim 3, wherein a friction member is provided in the body.

11. The stand module of claim 10, wherein one end of the body is coupled with the movement limiting portion formed at one end of the rod in a concavo-convexed manner.

12. The stand module of claim 11, wherein a vibration reduction member, having a larger cross-sectional area than the movement limiting portion, is provided on one end of the movement limiting portion.

13. The stand module of claim 2, wherein multiple grooves are formed in an outer circumferential surface of the first rod in an axial direction,
  wherein one or more locking members that, when inserted into the grooves, limit the rotation of the rod, are provided in the body.

14. The stand module of claim 13, wherein the locking member has elasticity,
  wherein the locking member include:
    a support portion that is inserted into the body; and
    one or more locking portions having a convex shape toward the grooves.

15. The stand module of claim 1, further comprising a third rod that is connected to the second rod with a hinge,
  wherein one end of the third rod is connected to a rear side of the body of the mobile terminal and the other end of the third rod comes into contact with a supporting object.

16. The stand module of claim 15, wherein the other end of the third rod has a flat surface.

17. The stand module of claim 1, wherein a vibration sensor that detects vibration when the second rod is flicked is provided on one side of the stand module.

18. The stand module of claim 17, wherein the detected vibration is used as an input value when an application embedded in the mobile terminal runs.

19. The stand module of claim 1, which is used as a DMB antenna.

20. A mobile terminal comprising the stand module of claim 1.

* * * * *